(12) United States Patent
Naumann

(10) Patent No.: US 10,479,001 B2
(45) Date of Patent: Nov. 19, 2019

(54) ROTARY DEVICE AND SPHERICAL RECEIVING DEVICE FOR RECEIVING AT LEAST ONE ROTATIONAL MOLD

(71) Applicant: ROTO evolution GmbH, Crimmitschau (DE)

(72) Inventor: Frank Naumann, Vollmershain (DE)

(73) Assignee: Roto Evolution GmbH, Crimmitschau (DE)

( * ) Notice: Subject to any disclaimer, the term of this patent is extended or adjusted under 35 U.S.C. 154(b) by 86 days.

(21) Appl. No.: 15/803,798

(22) Filed: Nov. 5, 2017

(65) Prior Publication Data
US 2018/0126606 A1 May 10, 2018

(30) Foreign Application Priority Data

Nov. 7, 2016 (LU) .......................................... 93290

(51) Int. Cl.
| | |
|---|---|
| *B29C 41/06* | (2006.01) |
| *B29C 41/04* | (2006.01) |
| *B29C 41/38* | (2006.01) |
| *B29C 41/46* | (2006.01) |

(52) U.S. Cl.
CPC ............ *B29C 41/045* (2013.01); *B29C 41/38* (2013.01); *B29C 41/46* (2013.01)

(58) Field of Classification Search
CPC ............ B29C 41/06; B29C 41/34; B28B 1/20
See application file for complete search history.

(56) References Cited

U.S. PATENT DOCUMENTS

| | | | |
|---|---|---|---|
| 2,946,092 A | 8/1958 | Yoder | |
| 3,003,188 A | 7/1959 | Weiss | |
| 3,309,762 A | 3/1967 | Harper | |
| 3,704,084 A | 11/1972 | Clay | |
| 6,511,619 B1 * | 1/2003 | Payne | ................. B29C 33/36 264/255 |
| 6,555,037 B1 | 4/2003 | Payne | |
| 10,005,201 B2 * | 6/2018 | Naumann | ............... B29C 33/30 |
| 2016/0039114 A1 | 2/2016 | Naumann | |

FOREIGN PATENT DOCUMENTS

| | | | |
|---|---|---|---|
| DE | 10 2015 103 384 | * | 9/2015 |
| EP | 2918386 A1 | | 9/2015 |

* cited by examiner

*Primary Examiner* — James P Mackey

(57) ABSTRACT

The invention relates to a spherical receiving device for receiving at least one rotational mold, which is configured and intended to be driven to rotate in a rotational device by means of a drive wheel rolling on the outer side of the spherical receiving device. The spherical receiving device is distinguished by the fact that it has at least one guiding device which causes a drive wheel rolling on the outer side of the spherical receiving device to follow a predetermined rolling path on the outer side of the spherical receiving device. The invention also relates to a rotational device which has such a spherical receiving device and a drive wheel which is driven by means of a drive motor, said drive wheel rolling on the outer side of the spherical receiving device and driving the spherical receiving device to rotate.

26 Claims, 4 Drawing Sheets

Figure 1:
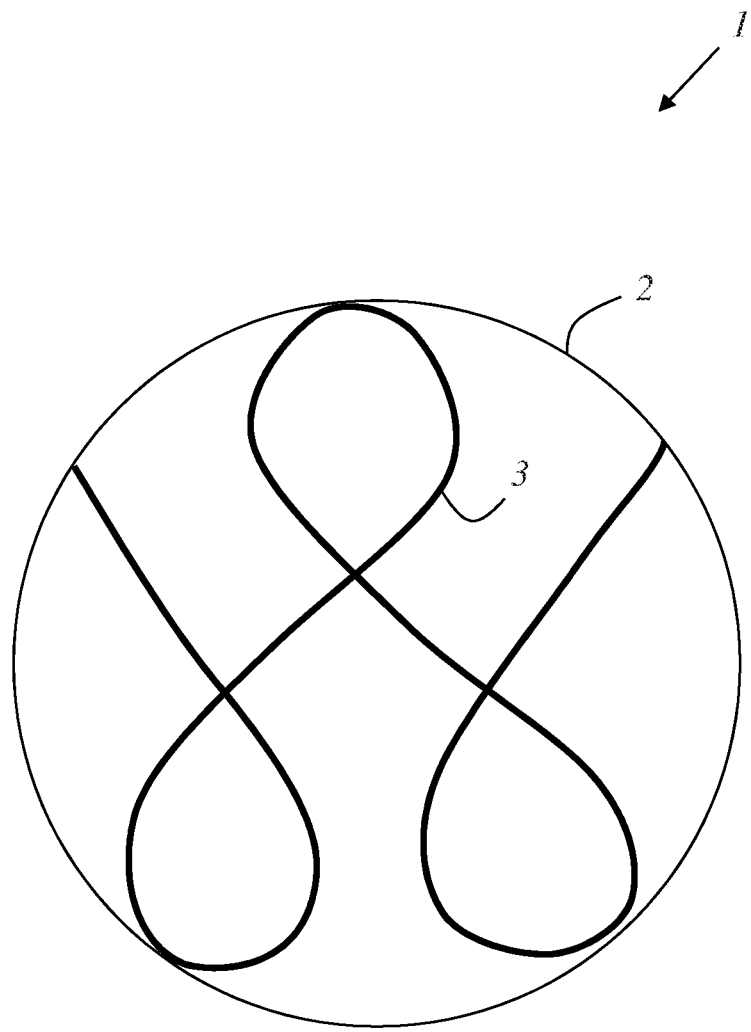

ROTARY DEVICE AND SPHERICAL RECEIVING DEVICE FOR RECEIVING AT LEAST ONE ROTATIONAL MOLD

The invention relates to a spherical receiving device for receiving at least one rotational mold, which is configured and intended to be driven to rotate in a rotational device by means of a drive wheel rolling on the outer side of the spherical receiving device.

The invention also relates to a rotational device having such a spherical receiving device.

In order to be able to produce rotational moldings from plastics materials, it is necessary to rotate a rotational mold charged with raw material and in the process to heat it to such a high temperature that the usually pulverulent or granular, in particular microgranular, raw material melts during the rotation process and accumulates on the inner wall of the mold. The rotational movement must not take place only about one axis of rotation here; rather, it is necessary to rotate the mold in at least two dimensions.

WO 2014/000 724 A1 discloses a rotational device for rotational moldings, which has a spherical receiving device for at least one mold, a holding device for the spherical receiving device and a drive unit for bringing about the rotational movement. The spherical receiving device consists of two parts and can be opened in a parting plane in order to charge the mold or in order to be able to remove the finished rotational molding from the mold. The spherical receiving device is driven to rotate by means of a motor-driven drive wheel rolling on the outer side. The drive wheel is arranged, together with the associated motor, beneath the spherical receiving device. In order to be able to change the direction of rotation of the spherical receiving device, the drive wheel is arranged, together with the motor, on a horizontal turntable, which can be rotated about a vertical axis by means of a further motor.

It is an object of the present invention to specify a spherical receiving device which allows particularly precise control of a rotational molding process in a simple manner.

The object is achieved by a spherical receiving device of the type mentioned at the beginning, wherein the receiving device has at least one guiding device which causes a drive wheel rolling on the outer side of the spherical receiving device to follow a predetermined rolling path on the outer side of the spherical receiving device.

A further object of the present invention is to specify a rotational device which allows particularly precise control of a rotational molding process.

The further object is achieved by a rotational device which has a spherical receiving device according to the invention and a drive wheel which is driven by means of a drive motor, said drive wheel rolling on the outer side of the spherical receiving device and driving the spherical receiving device to rotate.

The invention has the very particular advantage that rotation is possible not only about a single, spatially fixed axis of rotation of the spherical receiving device or sequentially about mutually perpendicular axes of rotation of the spherical receiving device, but rather rotation is allowed in a simple manner about continuously changing axes of rotation of the spherical receiving device in a manner adapted to the article to be produced. In particular, the invention has the advantage that such rotation about continuously changing axes of rotation of the spherical receiving device is possible by means of a rotational device which has only one drive wheel which rolls on the outer side of the spherical receiving device and drives the spherical receiving device to rotate. In particular, the drive wheel does not have to be rotatable or to be driven in a rotatable manner about an axis, in particular a vertical axis, that is different from its axis of rotation. Rather, the orientation of the axis of rotation of the drive wheel in space can be constant.

In a manner according to the invention and according to an independent inventive concept, it was first of all very generally found that it is particularly advantageous to rotate a spherical receiving device in a rotational device along a rotational curve which is adapted to the article to be produced. The aim here is to select the rotational curve such that the raw material inside the rotational mold, which is arranged inside the spherical receiving device, is distributed homogeneously. It is advantageous here for the raw material not to be guided too often over the same point, since otherwise an undesired accumulation of material arises at this point. Usually, it is advantageous for individual crossing points of the rotational curve not to be passed through excessively often.

Furthermore, it has been found that it is important, for an automated production process, to stop the spherical receiving device at the end of a rotational molding process exactly in the orientation which is necessary for the automated opening of the spherical receiving device and for the automated removal of the produced articles and for automated charging with fresh raw material. This, too, is advantageously allowed by the present invention, the complexity for control nevertheless being low.

In particular, the invention has the very particular advantage that precise traveling along a defined rotational curve and precise stopping in a predetermined or predeterminable orientation of the spherical receiving device are possible without it being necessary to synchronize a plurality of drive motors with one another at the same time in a complicated manner and without it being necessary to monitor the current orientation of the spherical receiving device actively with additional sensors. However, active monitoring of the current orientation of the spherical receiving device, for example with probes and/or optical sensors is quite possible in the rotational device according to the invention and appropriate in particular for monitoring an automated production sequence.

The invention has the very particular advantage that two-dimensional rotation of the spherical receiving device, which is preferably arranged in a fixed position, is reduced to a one-dimensional control problem of the requisite drive. As long as the electronic controller, proceeding from a known starting position and with a known direction of rotation, knows how many revolutions the drive wheel has completed or how many revolutions the drive motor or a transmission component interconnected in terms of drive has completed, it is possible to precisely and unambiguously infer the current orientation of the spherical receiving device.

In a corresponding manner, it is conversely possible, on account of this clear assignment, to set a predetermined or predeterminable orientation of the spherical receiving device easily, reliably and precisely. The predetermined or predeterminable orientation of the spherical receiving device can be for example an orientation that is necessary for automated opening of the spherical receiving device and for automated removal of the produced articles or for automated charging.

The guiding device of the spherical receiving device can be embodied in a wide variety of ways, as is described in detail in the following text by way of examples. In particular, provision can advantageously be made for the drive wheel to have a counterpart guiding device or to be configured as a counterpart guiding device which cooperates with the guiding device of the spherical receiving device.

In particular, provision can advantageously be made for the guiding device to be configured in an endless manner. For example, the guiding device can have a guiding slot arranged on the outer side of the spherical receiving device, said guiding slot extending along or parallel to the rolling path, the end of the guiding slot being joined directly to the start of the guiding slot. In this way, the spherical receiving device can be rotated along the defined rolling path for as long as desired.

In an advantageous embodiment of the spherical receiving device according to the invention, the guiding device has a guiding slot arranged on the outer side of the spherical receiving device, said guiding slot extending along or parallel to the rolling path. In particular, provision may advantageously be made for the guiding slot to be formed by two guide ribs arranged on the outer side of the spherical receiving device. In such an embodiment, the cooperation of the guiding device with the drive wheel takes place such that in each case at least that part of the drive wheel that is in direct contact with the spherical receiving device engages in the guiding slot arranged on the outer side of the spherical receiving device. The guiding slot and the drive wheel are preferably dimensioned such that that part of the drive wheel that engages in the guiding slot has a degree of play in the axial direction relative to the guide ribs of the guiding slot. This makes it possible for the guiding slot, in addition to the curvature that is necessary in any case on account of the spherical shape of the spherical receiving device, to be able to extend in a curved manner on the sphere surface without jamming occurring.

In another advantageous embodiment, the guiding device has a guide rail arranged on the outer side of the spherical receiving device, said guide rail extending along the rolling path or parallel to the rolling path. In this embodiment, provision can be made in particular for the drive wheel to have an encircling guiding slot in which the guide rail arranged on the outer side of the spherical receiving device engages. Preferably, the guide rail has a degree of lateral play in the guiding slot, such that, in addition to the curvature that is necessary in any case on account of the spherical shape of the spherical receiving device, a curved course of the guide rail, in particular deviating from a great circle or small circle, on the outer side of the spherical receiving device is allowed.

A great circle is a largest possible circle on a sphere surface. The center thereof always coincides with the center of the sphere and a section on the great circle divides the sphere into two halves in each case. Small circles are the circles on a sphere surface, the planes of which do not contain the center of the sphere.

In a very particularly advantageous embodiment, the guiding device is formed by a multiplicity of, in particular circular, openings which are arranged along the rolling path in the outer side of the spherical receiving device. The drive wheel can have, as counterpart guiding element, a toothing which is configured to cooperate with the openings extending along the rolling path. In particular, it is advantageously possible to provide for the drive wheel to have a toothing, the teeth of which engage in the openings extending along the rolling path.

In order to ensure precise compliance with a defined rotational curve, provision can be made in particular for the external dimensions of the teeth at the tooth root to be equal to the internal dimensions of the openings and/or for the outside diameter of the teeth at the tooth root to correspond to the inside diameter of the openings. In this way, play of the spherical receiving device relative to a tooth introduced fully into an opening is avoided, and so a precise orientation of the spherical receiving device is allowed. If only one tooth is in engagement in such a way, there still exists, with regard to the orientation of the spherical receiving device, only a degree of freedom of rotation of the spherical receiving device about the radial central axis of the engaging tooth.

In order to clearly define the orientation of the spherical receiving device, provision is therefore made, in a particular embodiment, for at least two teeth of the toothing to always be in engagement with the openings extending along the rolling path while the drive wheel rolls. In order in this case to allow a curved course of the arrangement of the openings in addition to the curvature that is necessary in any case on account of the spherical shape of the spherical receiving device, i.e. in a manner deviating from a great circle or a small circle, the teeth of the toothing can advantageously be configured in a conical or frustoconical manner. This makes it possible for the next tooth to be able to engage, in particular eccentrically, in the next opening even when the next opening is offset laterally somewhat on account of the curved course of the arrangement of the openings, because the tooth heads have a smaller diameter than the openings. Upon further engagement of the next tooth, the next opening is centered relative to the tooth, with the result that the orientation of the spherical receiving device is adapted, and so the defined rolling path is complied with precisely.

In an advantageous embodiment, the individual teeth are fastened to a main body of the drive wheel in a nondestructively releasable manner. In particular, the teeth may be screwed into the main body for example by way of a screw thread. This makes it possible to exchange individual teeth when they become worn without the entire drive wheel having to be replaced.

As an alternative to the described embodiment in which openings are provided in the spherical receiving device for a toothing of the drive wheel, provision can also conversely be made for the drive wheel to have openings in which teeth that are arranged along the rolling path on the outer side of the spherical receiving device engage.

In another embodiment, the spherical receiving device has a toothing extending along the rolling path, said toothing meshing with a counterpart toothing of the drive wheel.

In a very particularly advantageous embodiment, the spherical receiving device is assembled from several hollow sphere sections. In particular, provision can advantageously be made for the individual hollow sphere sections to be provided with different portions of the guiding device before assembly, said portions forming the entire guiding device after the hollow sphere sections have been assembled. For example, provision can advantageously be made for individual hollow sphere sections to have portions of a guiding groove and for the hollow sphere sections to be joined together after assembly such that the guiding slot portions are arranged next to one another in a row without any offset.

In particular, provision can advantageously be made for the spherical receiving device to have at least two hollow sphere segments which can be at least partially detached from one another in order to open the spherical receiving device or can be pivoted relative to one another, for example by means of a hinge.

It is necessary to open the spherical receiving device in order to provide the spherical receiving device with at least one rotational mold and in order to charge the rotational mold arranged in the spherical receiving device and also in order to be able to remove finished rotational moldings. Advantageously, provision can be made for at least one of the at least two hollow sphere segments, in particular as described above, to be assembled from several hollow sphere sections.

In particular, provision can advantageously be made for several hollow sphere sections, together with their respective portion of the guiding device, to be formed in an identical manner, in particular to have an identical shape and/or size. Such an embodiment allows cost-effective and efficient mass production of spherical receiving devices.

In a very particularly advantageous embodiment, the spherical receiving device has two electrically conductive segments which are electrically insulated from one another along the rolling path, in particular by means of the guiding device. Such an embodiment has the very particular advantage that it is possible to supply a device, for example an electric heater, arranged in the spherical receiving device with electrical energy. For example, it is possible in this way to electrically heat or electrically cool a rotational mold.

In one possible embodiment, the rotational device has two contact elements which are positioned such that one is always in contact with one of the two electrically conductive segments and the other is always in contact with the other of the two electrically conductive segments. In this way, it is possible to connect both segments to a different electrical potential level. In order to operate a heater arranged inside the spherical receiving device, said heater then merely has to be connected from the inside in an electrically conducting manner both to the one segment and to the other segment.

In a very particularly advantageous embodiment and according to an independent inventive concept which can also be realized separately from the presence of a guiding device and/or of a counterpart guiding device, provision is advantageously made for the drive wheel to be configured as an electrical contact element for transmitting electric current to the spherical receiving device, or for the drive wheel to have at least one contact element, configured in particular as a contact roller, for transmitting electric current to the spherical receiving device.

In a particular embodiment relating to this independent inventive concept, the spherical receiving device has two segments that are electrically insulated from one another, in particular by means of the guiding device, along the rolling path. In this case, two contact elements can advantageously be arranged on the drive wheel, of which one is always in electrically conducting contact with one of the segments and the other is always in electrically conducting contact with the other of the segments. In particular, the contact elements can be configured as contact rollers which roll on the outer side of the spherical receiving device and are arranged axially on different sides of the drive wheel. Alternatively, it is also possible for the contact elements to be configured as sliding contacts which slide along the outer side of the spherical receiving device.

As already mentioned, it is advantageously possible to provide for the electrical insulation between the two electrically conductive segments to be able to be realized by the guiding device. For example, the guiding device can be configured at least partially as an insulator that is curved along the rolling path, the two segments adjoining said insulator from different sides.

In a particularly advantageous embodiment of the rotational device, the drive wheel is mounted so as to be rotatable about an axis of rotation which is oriented tangentially relative to the spherical receiving device, this meaning that the axis of rotation is a parallel to a tangent to the outer side of the spherical receiving device.

Preferably, the orientation of the axis of rotation relative to the position of the spherical receiving device does not change during the rotational molding process. Rather, it is advantageous, for precise traveling on the rolling path defined by the guiding device, for the axis of rotation and the position of the drive wheel to remain in a fixed position, in particular relative to the center of the spherical receiving device.

Preferably, the spherical receiving device is mounted in a rotatable manner such that it remains in a fixed position during a rotational molding operation and rotates only about its center.

In a particular embodiment of the rotational device, a sensor is provided which measures the rotary position and/or the number of revolutions of the drive wheel proceeding from a starting position or the number of revolutions of a driveshaft of the drive motor proceeding from a starting position or the number of revolutions of a rotational component interconnected in terms of drive, proceeding from a starting position. Using this information, on account of the clear coupling of the movement of the drive wheel relative to the movement of the spherical receiving device, it is always possible to infer the current orientation of the spherical receiving device.

Preferably, the position of the spherical receiving device relative to the drive wheel does not change during a rotational molding process. Rather, provision can advantageously be made for the drive wheel and the spherical receiving device to remain in a fixed position with respect to one another while the spherical receiving device rotates. For this purpose, guiding elements may be provided which keep the spherical receiving device in its position. The drive wheel can advantageously be arranged beneath the spherical receiving device. In particular, the drive wheel can itself act as a guiding device which keeps the spherical receiving device in position. In particular, the drive wheel can be configured to bear the weight of the spherical receiving device, at least substantially.

Preferably, only one drive wheel is provided, which rolls on the outer side of the spherical receiving device and drives the spherical receiving device to rotate.

Figure 2:
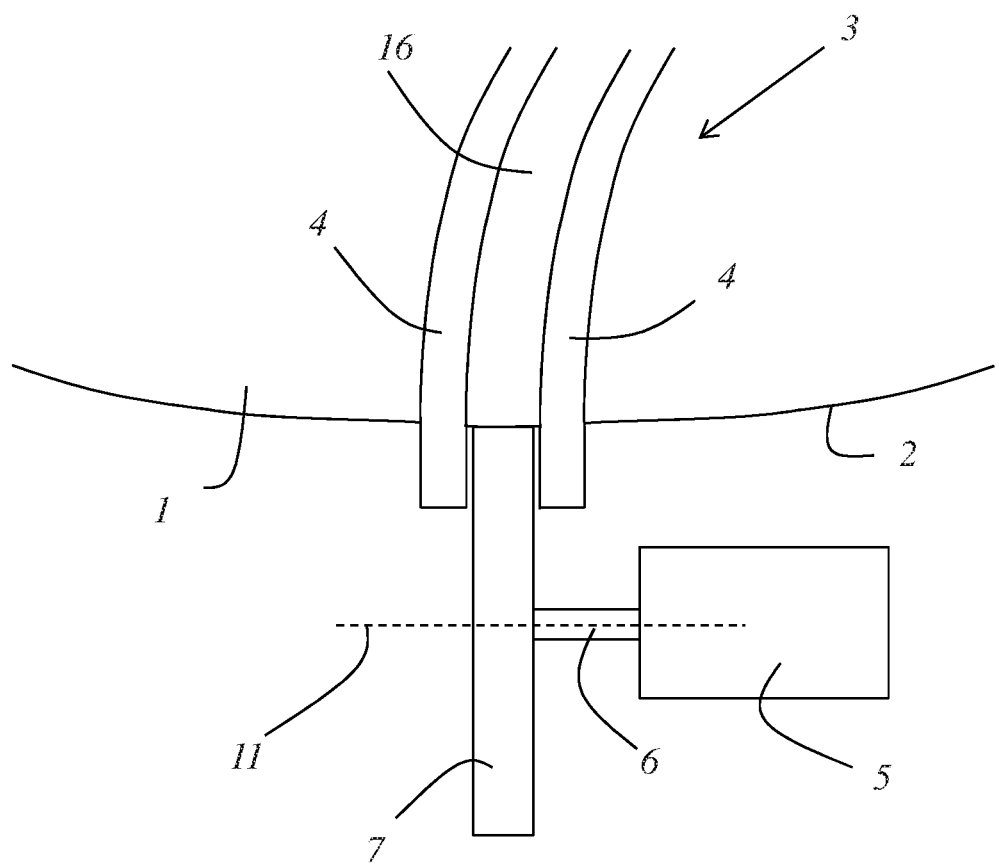
Figure 3:
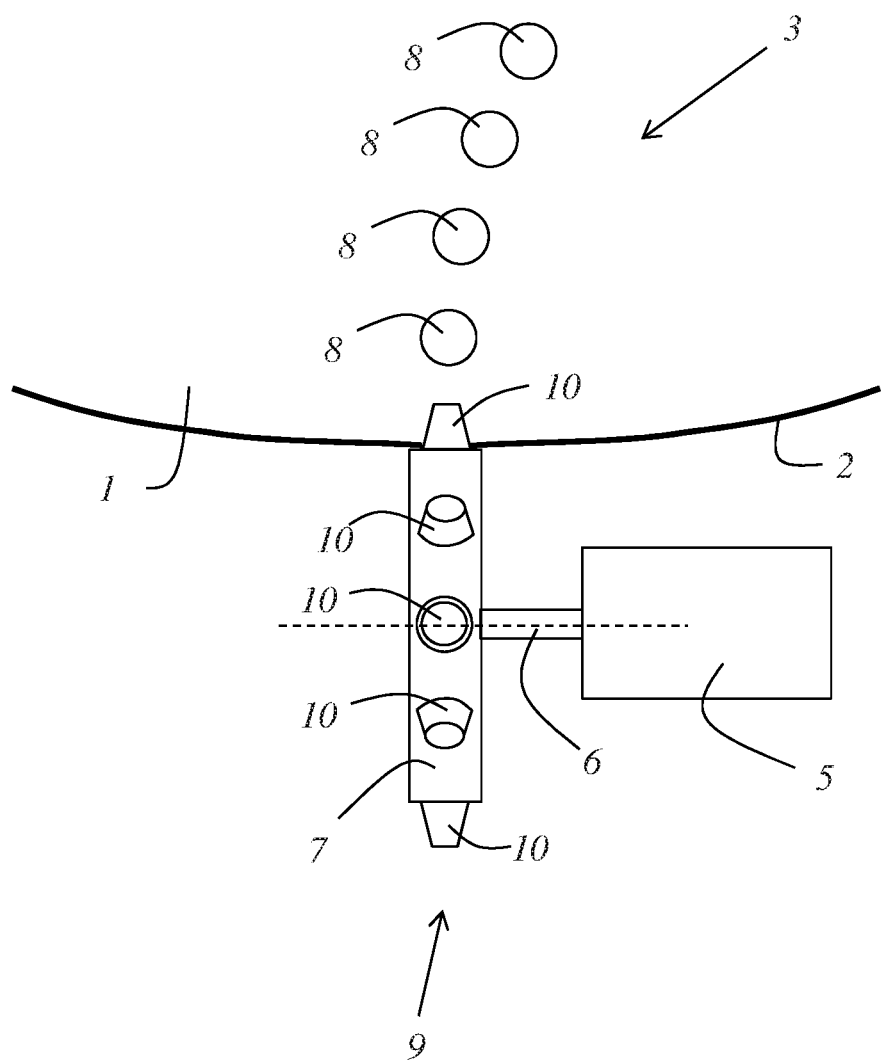
Figure 4:
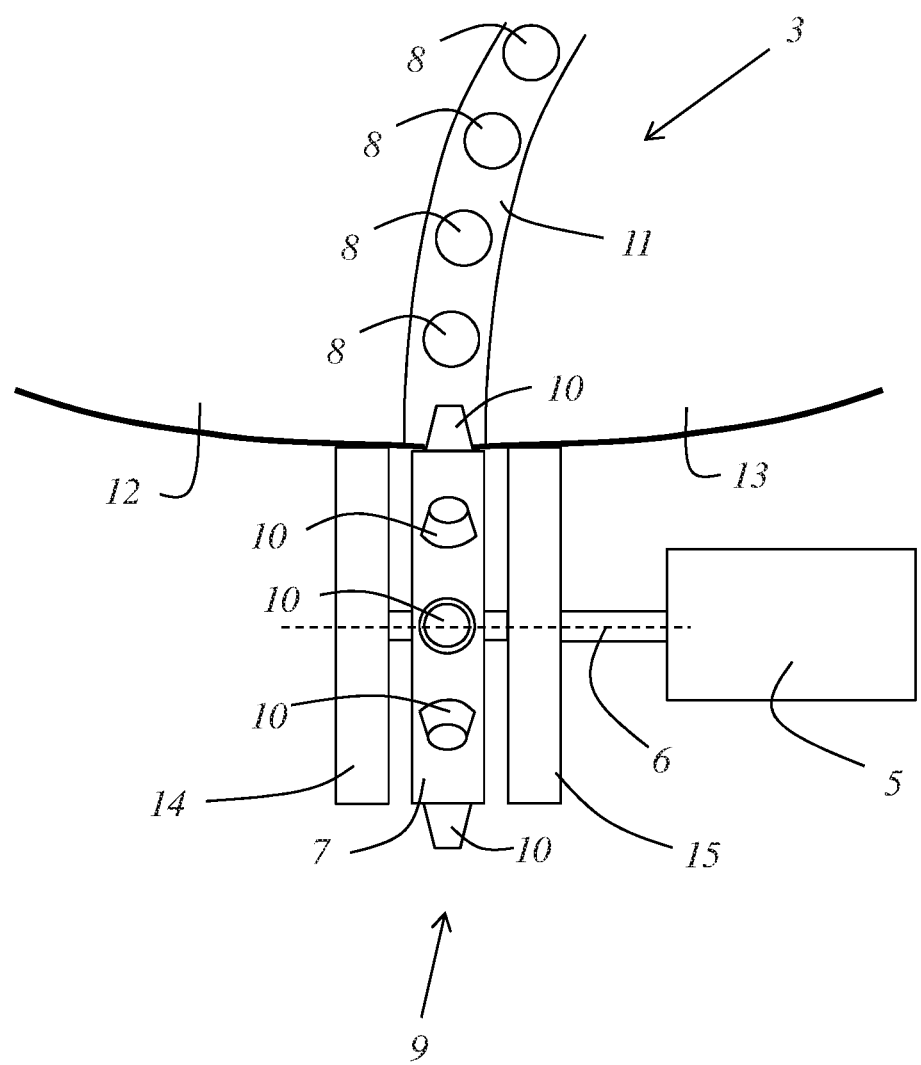

The subject matter of the invention is illustrated by way of example and schematically in the drawing and is described in the following text with reference to the figures, wherein identical or identically acting elements are usually provided with the same reference signs even in different exemplary embodiments. In the figures:

FIG. 1 shows a schematic exemplary embodiment of a spherical receiving device according to the invention, FIG. 2 shows a detail view of a first exemplary embodiment of a rotational device according to the invention, FIG. 3 shows a detail view of a second exemplary embodiment of a rotational device according to the invention, and FIG. 4 shows a third exemplary embodiment of a rotational device according to the invention.

FIG. 1 shows a spherical receiving device 1 for receiving at least one rotational mold, which is configured and intended to be driven to rotate in a rotational device by means of a drive wheel rolling on the outer side 2 of the spherical receiving device 1. The spherical receiving device 1 has a guiding device 3 which causes a drive wheel rolling on the outer side of the spherical receiving device 1 to follow a predetermined rolling path on the outer side 2 of the spherical receiving device 1.

FIG. 2 shows a detail view of a first exemplary embodiment of a rotational molding device according to the invention, which contains a spherical receiving device 1 according to the invention with a guiding device 3. The guiding device 3 has a guiding slot 16 arranged on the outer side of the spherical receiving device 1, said guiding slot 16 extending along the rolling path. The guiding slot 16 is formed by two guide ribs 4 arranged on the outer side of the spherical receiving device 1.

The rotational device also has a drive wheel 7 driven by means of a drive motor 5 via a driveshaft 6, said drive wheel 7 rolling on the outer side 2 of the spherical receiving device 1 and driving the spherical receiving device 1 to rotate.

Lateral play exists between that part of the drive wheel 7 that engages in the guiding slot 16 and the guide ribs 4, such that a curved course (in addition to the curvature necessary in any case on account of the spherical shape of the spherical receiving device) of the guiding device is allowed on the outer side of the spherical receiving device 1. The drive wheel can advantageously be provided on its outer circumferential side with a friction increasing coating, for example with a rubber coating, in order to be able to reliably transmit a torque to the spherical receiving device 1.

FIG. 3 shows a detail view of a second exemplary embodiment of a rotational device according to the invention. In this exemplary embodiment, the guiding device 3 has openings 8 arranged along the rolling path, said openings 8 being configured to cooperate with a toothing 9 of the drive wheel 7. In this exemplary embodiment, too, the drive wheel 7 is driven to rotate by means of a drive motor 5.

The teeth 10 of the toothing 9 are configured in a frustoconical manner. The outside diameter of the teeth 10 at the tooth root corresponds to the inside diameter of the openings 8. In the direction away from the axis of rotation 11 about which the drive wheel 7 rotates, the diameter of the teeth 10 decreases. This allows the course of the openings 8 on the outer side of the spherical receiving device 1 to extend in a curved manner (deviating from a great circle or a small circle).

FIG. 4 shows a detail view of a third exemplary embodiment of a rotational device according to the invention. In this exemplary embodiment, the guiding device has a band 11, provided with openings 8, made of an electrically insulating material. The band 11 extends along the rolling path. Furthermore, the band 11 serves as electrical insulation between a first electrically conductive segment 12 and a second electrically conductive segment 13 of the spherical receiving device 1.

On the drive wheel 7, a first contact roller 14 and a second contact roller 15 are arranged such that the first contact roller always rolls on the outer surface of the first conductive segment 12 and the second contact roller 15 always rolls on the outer surface of the second electrically conductive segment 13. The contact rollers 14, 15 are arranged coaxially with the drive wheel 7. The contact rollers 14, 15 are at different electrical potential levels in order to be able to transmit electric current into the interior of the spherical receiving device 1 via the electrically conductive segments 12 and 13. This is the case for example in order for it to be possible to electrically heat or electrically cool a rotational mold (not illustrated) arranged in the interior of the spherical receiving device 1.

LIST OF REFERENCE SIGNS

1 Spherical receiving device
2 Outer side
3 Guiding device
4 Guide rib
5 Drive motor
6 Driveshaft
7 Drive wheel
8 Openings
9 Toothing
10 Teeth
11 Axis of rotation
12 First electrically conductive segment
13 Second electrically conductive segment
14 First contact roller
15 Second contact roller
16 Guiding slot

The invention claimed is:

1. A spherical receiving device (1) for receiving at least one rotational mold, which is configured and intended to be driven to rotate in a rotational device by means of a drive wheel (7) rolling on the outer side (2) of the spherical receiving device (1), wherein the receiving device (1) has at least one guiding device (3) which causes the drive wheel (7) rolling on the outer side (2) of the spherical receiving device (1) to follow a predetermined rolling path on the outer side (2) of the spherical receiving device (1).

2. The spherical receiving device (1) as claimed in claim 1, wherein the guiding device (3) has a guiding slot (16) arranged on the outer side (2) of the spherical receiving device (1), said guiding slot (16) extending along or parallel to the rolling path.

3. The spherical receiving device (1) as claimed in claim 2, wherein the guiding slot (16) is formed by two guide ribs (4) arranged on the outer side (2) of the spherical receiving device (1).

4. The spherical receiving device (1) as claimed in claim 1, wherein the guiding device (3) has a guide rail arranged on the outer side (2) of the spherical receiving device (1), said guide rail extending along the rolling path or parallel to the rolling path.

5. The spherical receiving device (1) as claimed in claim 1, wherein the guiding device (3) has openings (8), extending along the rolling path, in the outer side (2) of the spherical receiving device (1), said openings (8) being configured to cooperate with a toothing (9) on the drive wheel (7).

6. The spherical receiving device (1) as claimed in claim 1, wherein the guiding device (3) has, on the outer side (2), a toothing extending along the rolling path, said toothing being configured to cooperate with a counterpart toothing on the drive wheel (7).

7. The spherical receiving device (1) as claimed in claim 1, wherein the spherical receiving device (1) has two electrically conductive segments (12, 13) which are electrically insulated from one another along the rolling path by the guiding device (3).

8. The spherical receiving device (1) as claimed in claim 1, wherein the spherical receiving device (1) is assembled from several hollow sphere sections which have different portions of the guiding device (3).

9. A rotational device which has a spherical receiving device (1) as claimed in claim 1 and a drive wheel (7) which is driven by means of a drive motor (5), said drive wheel (7) rolling on the outer side (2) of the spherical receiving device (1) and driving the spherical receiving device (1) to rotate.

10. The rotational device as claimed in claim 9, wherein the drive wheel (7) has a counterpart guiding device or is configured as a counterpart guiding device which cooperates with the guiding device (3) of the spherical receiving device (1).

11. The rotational device as claimed in claim 9, wherein the drive wheel (7) is mounted so as to be rotatable about an axis of rotation that is oriented tangentially relative to the spherical receiving device (1).

12. The rotational device as claimed in claim 9, wherein a sensor is provided which measures the rotary position and/or a number of revolutions of the drive wheel (7) or of a driveshaft (6) of the drive motor (5) or of a rotation transmission component by way of which rotation is transmitted from the driveshaft (6) to the drive wheel (7).

13. The rotational device as claimed in claim 9, wherein only one drive wheel (7) is provided, which rolls on the outer side (2) of the spherical receiving device (1) and drives the spherical receiving device (1) to rotate.

14. The rotational device as claimed in claim 9, wherein at least that part of the drive wheel (7) that is in direct contact with the spherical receiving device (1) engages in a guiding slot (16) arranged on the outer side (2) of the spherical receiving device (1), said guiding slot (16) extending along or parallel to the rolling path.

15. The rotational device as claimed in claim 9, wherein the drive wheel (7) has an encircling guiding slot in which a guide rail arranged on the outer side (2) of the spherical receiving device (1) engages, said guide rail extending along the rolling path or parallel to the rolling path.

16. The rotational device as claimed in claim 9, wherein the drive wheel (7) has openings in which the teeth of a toothing, arranged along the rolling path, of the spherical receiving device (1) engage.

17. The rotational device as claimed in claim 9, wherein the drive wheel (7) has a toothing (9), the teeth (10) of which engage in openings (8), extending along the rolling path, in the outer side (2) of the spherical receiving device (1).

18. The rotational device as claimed in claim 16, wherein the teeth (10) of the toothing (9) are configured in a conical or frustoconical manner.

19. The rotational device as claimed in claim 16, wherein
   a. the external dimensions of the teeth (10) at the tooth root are identical to the internal dimensions of the openings (8), and/or wherein
   b. the outside diameter of the teeth (10) at the tooth root corresponds to the inside diameter of the openings (8).

20. The rotational device as claimed in claim 16, wherein at least two teeth (10) of the toothing (9) are always in engagement while the drive wheel (7) rolls.

21. The rotational device as claimed in claim 9, wherein the spherical receiving device (1) has a toothing extending along the rolling path, said toothing meshing with a counterpart toothing of the drive wheel (7).

22. The rotational device as claimed in claim 9, wherein the drive wheel (7) is configured as an electrical contact element for transmitting electric current to the spherical receiving device (1).

23. The rotational device as claimed in claim 9, wherein the drive wheel (7) has at least one contact element, configured as a contact roller (14, 15), for transmitting electric current to the spherical receiving device (1).

24. The rotational device as claimed in claim 9, wherein the spherical receiving device (1) has two segments (12, 13) that are electrically insulated from one another by the guiding device (3), along the rolling path, and wherein two contact elements are arranged on the drive wheel (7), of which one is in electrically conducting contact with one of the segments (12, 13) and the other is in electrically conducting contact with the other of the segments (12, 13).

25. The rotational device as claimed in claim 24, wherein the contact elements are configured as contact rollers (14, 15) which roll on the outer side (2) of the spherical receiving device (1).

26. The rotational device as claimed in claim 24, wherein the contact elements are configured as sliding contacts which slide along the outer side (2) of the spherical receiving device (1).

* * * * *